April 5, 1927.  A. G. THOMPSON ET AL  1,623,449

METAL CUTTING MACHINE

Filed Nov. 17, 1924   5 Sheets-Sheet 1

Inventors
Arthur G. Thompson
Linus K. Sprague
by Heard Smith & Tennant.
Attys.

April 5, 1927.
A. G. THOMPSON ET AL
1,623,449
METAL CUTTING MACHINE
Filed Nov. 17, 1924      5 Sheets-Sheet 2
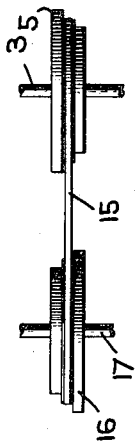
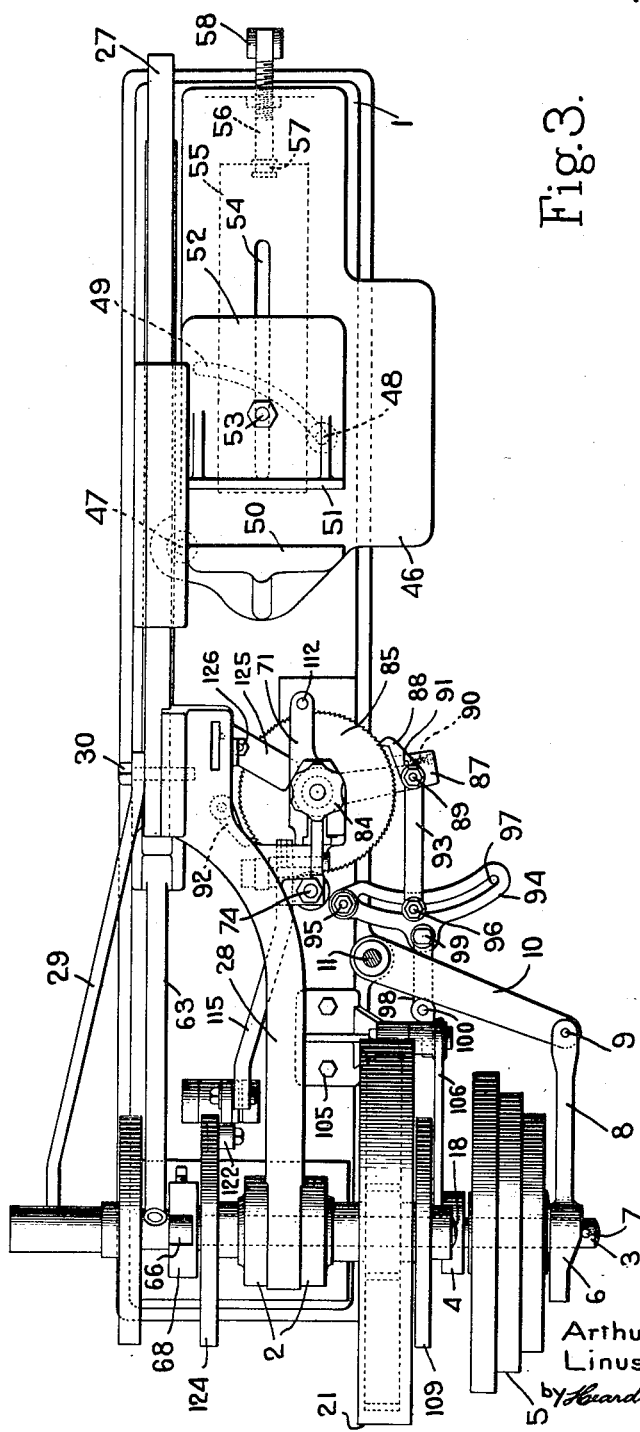
Inventors.
Arthur G. Thompson
Linus K. Sprague
by Heard Smith & Tennant.
Attys.

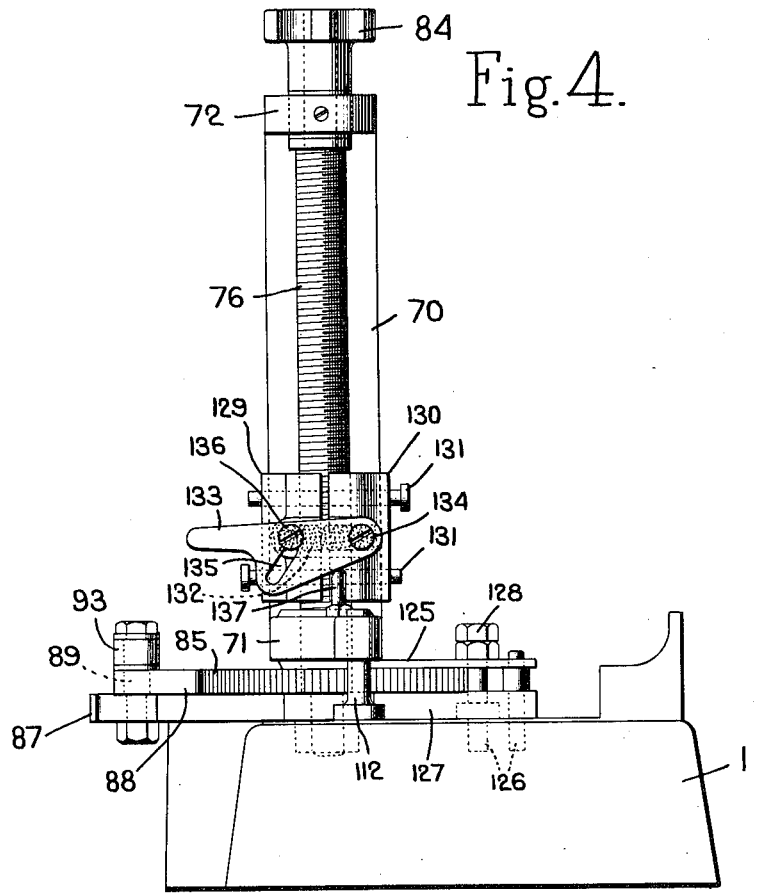
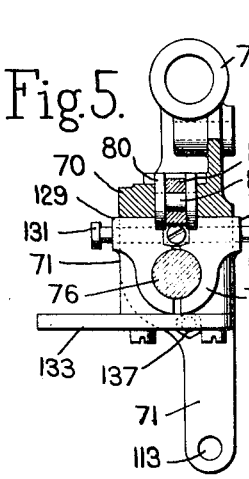
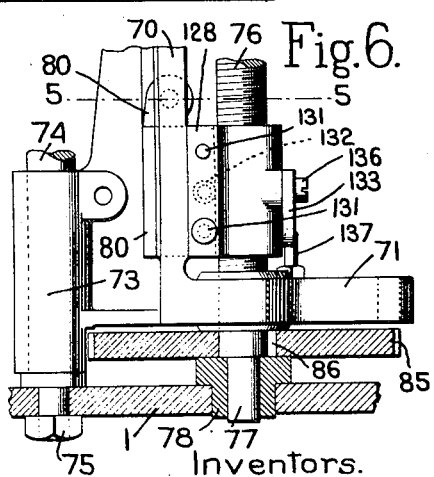

April 5, 1927.
A. G. THOMPSON ET AL
1,623,449
METAL CUTTING MACHINE
Filed Nov. 17, 1924   5 Sheets-Sheet 4
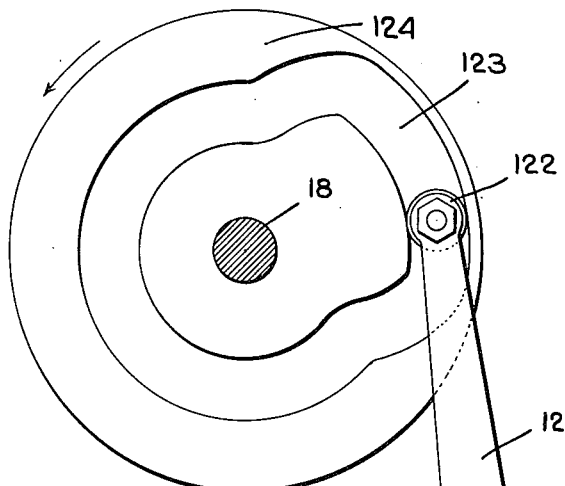
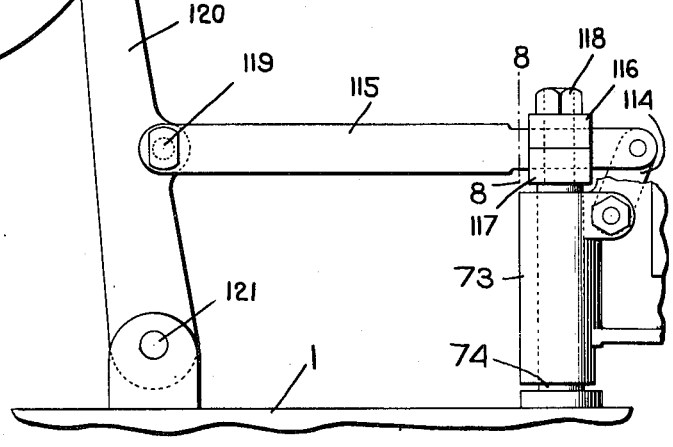
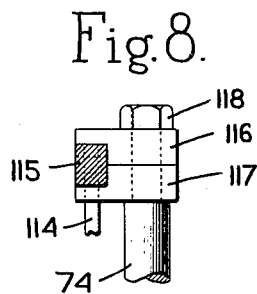
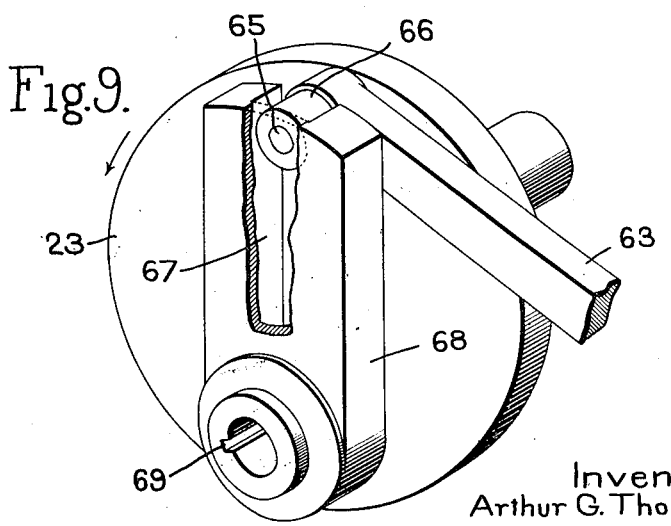
Inventors.
Arthur G. Thompson
Linus K. Sprague
by Heard Smith & Tennant
Attys.

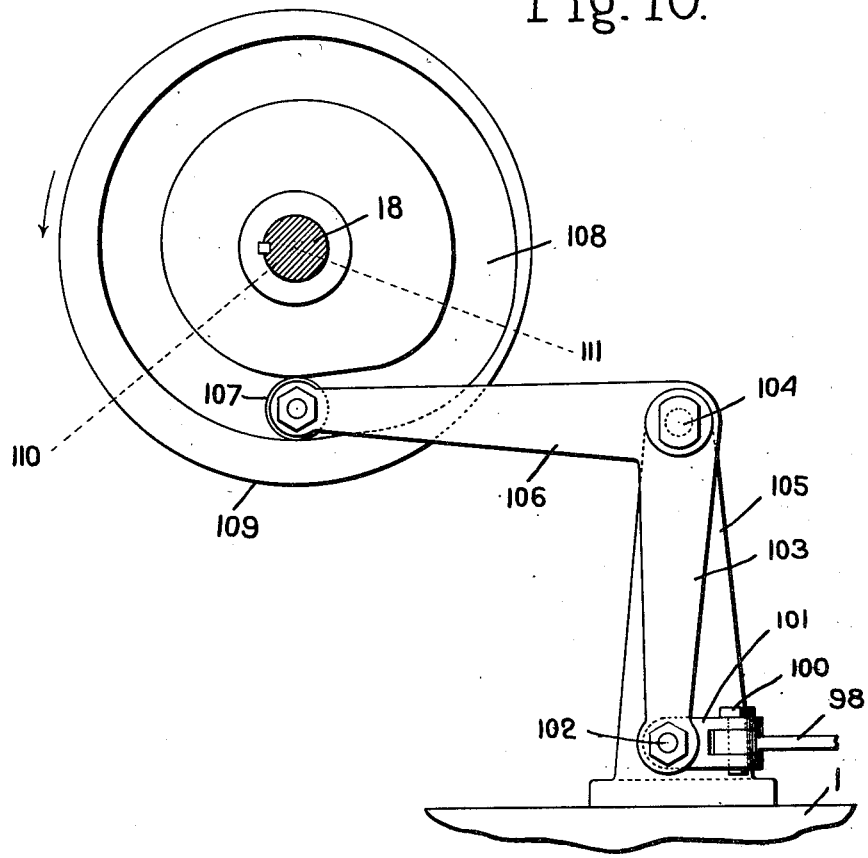
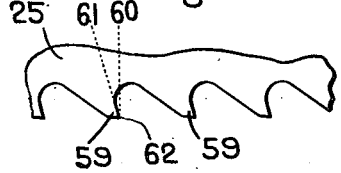

Patented Apr. 5, 1927.

1,623,449

UNITED STATES PATENT OFFICE.

ARTHUR GRAHAM THOMPSON, OF NEW YORK, N. Y., AND LINUS K. SPRAGUE, OF NEW HAVEN, CONNECTICUT, ASSIGNORS TO THE HENRY G. THOMPSON & SON COMPANY, OF NEW HAVEN, CONNECTICUT, A CORPORATION OF CONNECTICUT.

METAL-CUTTING MACHINE.

Application filed November 17, 1924. Serial No. 750,285.

This invention relates to improvements in metal cutting machines in which the cutting action is performed by a reciprocating saw blade and the general object thereof is to provide a machine of this type which will cut with relatively high speed, with accuracy and with uniformity of time for each similar cut, and in which the saw blade will have a far longer and more effective life than heretofore.

The present invention utilizes the broad principles made the subject of the patent of Thompson and Smith, No. 1,596,033, granted August 17, 1926, and is therefore subsidiary to the broad invention disclosed and claimed in the said patent.

The principal object of the present invention is therefore to provide a metal cutting machine employing a saw blade having a reciprocating movement with alternating cutting and return or idle strokes, in which machine shall be embodied the required correlation of its elements with the stock being cut.

The object of the invention is, therefore, to provide a metal cutting machine of the reciprocating saw blade type in which the saw blade has its edge provided with teeth and with gullets intermediate the successive teeth, each of sufficient capacity to receive and hold all of the metal cut by the following tooth in making one cut across the maximum cutting field or the maximum width of the stock being cut, in which means are provided for reciprocating the saw blade to give alternating cutting and return strokes, with the return stroke in each case above the path of the cutting stroke, in which means are provided which act during the cutting stroke of the saw blade continuously, positively and uniformly to feed the saw blade relatively to the work support, and in which machine (1) the speed of the saw blade during the cutting stroke, (2) the relative feeding movement between the saw blade and the stock or work support, (3) the resistive properties of the stock being cut, (4) the maximum cutting field or the maximum width of the stock being cut and (5) the capacity of the gullets of the saw blade are so correlated that each tooth during its cutting operation on the stock will cut metal therefrom of a maximum bulk not greater than the capacity of a gullet and chiefly in strip form.

The object of the invention is further to provide such a machine in which the speed of the reciprocation of the saw blade may be adjusted and the rate of the relative feeding movement between the saw blade and the stock or work support may be adjusted so as readily to enable the required correlation to be effected according to the resistive properties of the stock being cut, the size or maximum cutting field of the stock and the gullet capacity of the saw blade employed so as to secure the required results while keeping within the endurance capacity of the saw blade or, in other words, without breaking the teeth of the saw blade or the saw blade itself.

The object of the invention is further to provide feeding mechanism for the saw blade, acting during the cutting stroke with a variable movement compensatory to the variable reciprocatory movement of the saw so that the feeding movement shall be uniform. It is obvious that the cutting stroke of a reciprocating saw blade will usually have a variable speed owing to the mechanism usually and necessarily employed for effecting reciprocation and to the character of the movement itself, which requires that the blade shall come to a dead stop at each end of each stroke. What is required to secure the desired results is that the feeding movement of the saw blade with respect to the work shall be uniform per unit of cutting stroke of the blade; that is to say, the uniformity required is not of absolute feeding movement, but the feeding movement varies in correlation with and in substantially the same proportion as the variations in the speed of the saw.

The best results of the invention are believed to be secured by providing continuous, positive and uniform relative feeding movement between the saw blade and the work. When this is done, the time required to saw a given piece of stock may be accurately determined and will be the same at all times for the same size and character of stock, regardless of the number of cuts, until the saw blade is worn out. But the advantages of the invention may be obtained without a strictly uniform feeding movement if the remaining features of the invention be present, and if the relative feeding movement is continuous and positive, provided the feeding movement is of such a character as to prevent the saw blade from having at any time a greater than a predetermined depth of penetration into the stock.

The invention in its preferred form, therefore, embodies a positive screw feeding mechanism which during the cutting stroke acts continuously, positively and uniformly (using the latter term in the sense already defined), to effect the feeding movement. With this type of feed, the saw blade is not only fed continuously and positively by reason of the downward thrust of the screw, but it is also fed uniformly by reason of the upward thrust of the screw, which prevents the saw blade from penetrating the stock to an extent greater than the predetermined amount. With the screw type of feed such as herein illustrated, the feeding movement is therefore continuous, positive and uniform, but substantial advantages of the invention may be secured with any continuous, positively acting feed mechanism provided that, when an occasional occurrence of a decrease in the resistive properties of the stock takes place, the saw is prevented from penetrating the stock to an extent greater than the predetermined amount.

The invention also has for its object the provision of various novel mechanisms for securing various features of the invention both broadly considered and in the preferred form herein disclosed.

These and other objects and features of the invention will be made clear in the accompanying description and drawings and will be more particularly defined in the claims.

A simple and preferred form of machine embodying the invention is illustrated in the accompanying drawings, in which:

Fig. 2 is a top plan view of the machine.

Fig. 3 is a plan view of a detail illustrating a speed varying driving means for the machine.

Fig. 4 is a front elevation of the main elements of the feeding mechanism.

Fig. 5 is a detail in horizontal cross section taken on the line 5—5 of Fig. 6.

Fig. 6 is a side elevation partially in vertical cross section of the lower portion of the construction shown in Fig. 4.

Fig. 7 is a side elevation of the cam and connections by which the lifting and lowering movements at the beginning and end of the return stroke of the saw blade are secured.

Fig. 8 is a detail looking toward the right of Fig. 7 and taken in cross section on the line 8—8.

Fig. 9 is a detail in perspective, and partially broken away, of the crank mechanism for reciprocating the saw frame.

Fig. 10 is a detail in side elevation of the cam and connections by which the feeding mechanism is actuated.

Fig. 11 is a detail view of a preferred form of a portion of a saw blade particularly adapted for use in this invention.

Figure 1:
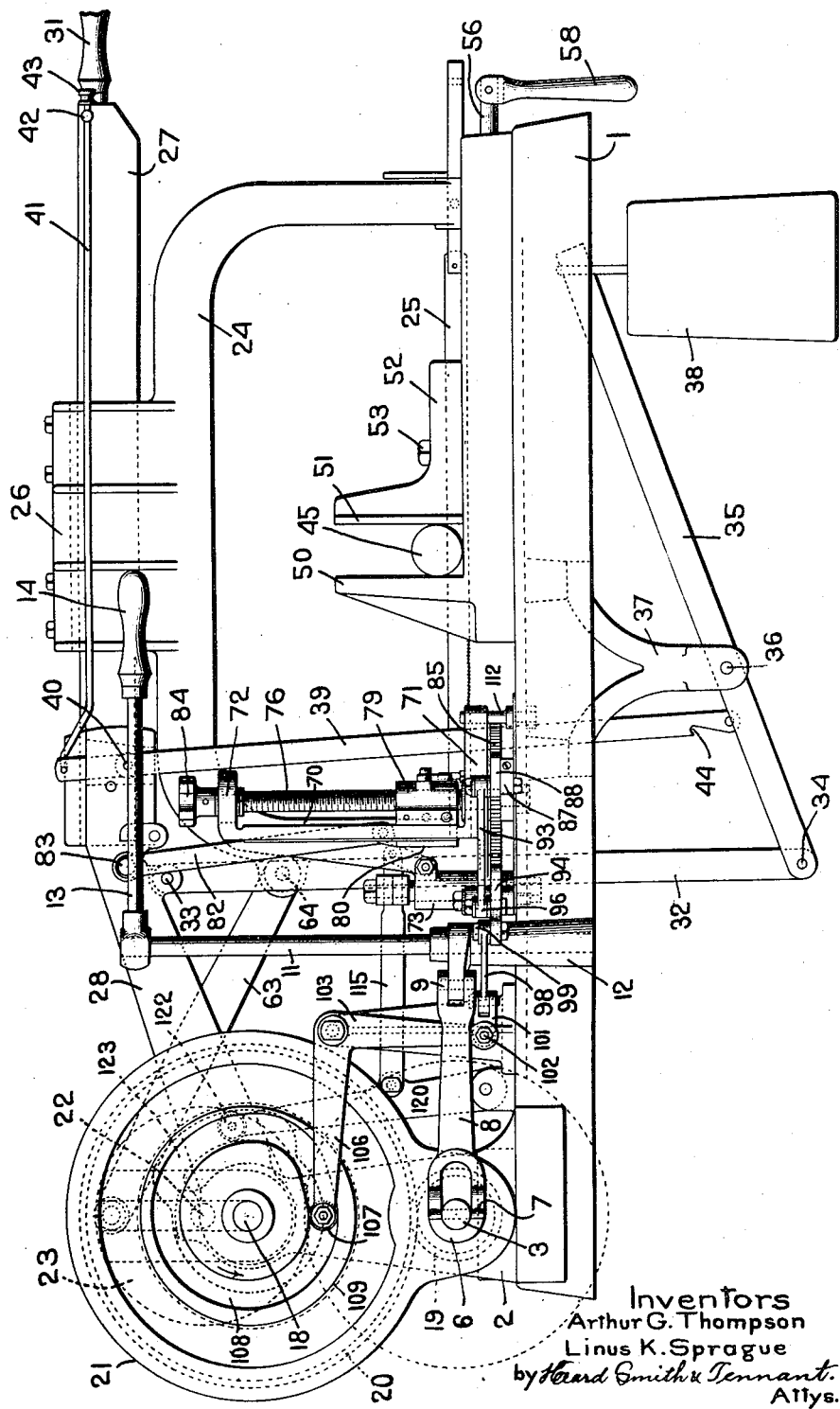
Fig. 1 is a side elevation of the machine with the clutch and driving pulleys removed.

The machine herein selected for an embodiment of the present invention is in many of its general features similar to an ordinary type of power operated hack saw machine, and hence it is only necessary to illustrate and describe in detail those features of the machine which are particularly concerned with the present invention.

The machine as illustrated presents a generally rectangular base or supporting bed 1, which may be mounted on legs, not shown, or in any other suitable manner. This supporting bed is provided at the rear end with suitable brackets and uprights such as 2, in which are journalled the main driving or operating elements of the machine.

The main shaft 3 has fixedly mounted thereon a clutch disk 4. A pulley 5, herein shown as of the cone or step type, is loosely mounted on the shaft 3. A clutch member 6 of the wedge type is mounted to slide on the shaft 3 between the outer face of the pulley 5 and a transverse pin 7 passing through the shaft 3. This clutch member 6 has a rigid arm 8 pivoted at 9 to a crank arm 10, projecting from a shaft 11, journalled in a boss 12 formed on the bed support 1. This shaft 11 extends upwardly to a convenient point and is provided with an operating crank arm 13 having a handle 14. The operative therefore, by turning the handle 14, readily clutches the pulley 5 to or unclutches it from, the clutch disk 4 and consequently the main shaft 3.

Suitable means are provided for varying or adjusting the speed of rotation of the shaft 3, and thus the speed of reciprocation of the saw. Any specific means may be employed for this purpose, as such means specifically considered is old and common and forms no part of the present invention. In Fig. 3 there is illustrated a simple form of change speed drive which will effect this purpose. The driving belt 15 extends from the cone or step pulley 5 over an oppositely disposed cone or step pulley 16, mounted upon a shaft 17 driven from any suitable source of power. Consequently by shifting the belt 15 the speed may be varied as desired. Three changes of speed are indicated and will usually be found sufficient, but any number may be provided.

A shaft 18 is mounted above and parallel with the main shaft 3 and is driven therefrom by means of a pinion 19 secured to the main shaft 3 and intermeshing with a gear 20 secured to this cam shaft 18. This pinion and gear are preferably enclosed by the casing 21.

At the side of the machine opposite the driving pulley, a third and stub shaft 22 is mounted above and parallel with the cam shaft 18 and carries rigidly secured thereto the crank disk 23.

The saw frame 24 is of the usual inverted U-shape and has mounted in the lower ends of its arms the saw blade 25. This saw frame is provided with an upwardly extending guide boss 26, which is fitted to and slides upon the horizontally extending portion 27 of a saw guide arm, an offset extension 28 of which is pivoted to swing about the axis of the cam shaft 18. This saw guide arm is further steadied in its movement by a brace arm 29 secured thereto by the set screw 30, offset in a direction opposite to that of the extension 28 and also pivoted to swing about the axis of the cam shaft 18. A handle 31 projecting from the guide arm 27 enables the guide arm with the saw frame and saw to be raised and lowered manually.

The weight of the guide arm, saw frame and saw is preferably counterbalanced. For that purpose a link 32 pivoted at 33 to the guide arm extends downwardly beneath the supporting bed and is pivoted at 34 to a lever 35 fulcrumed at 36 on a bracket 37 projecting downwardly from the supporting bed. A counterbalancing weight 38 is hung on the free end of the lever 35.

Means are also provided to hold the guide arm, saw frame and saw in elevated position to allow of the insertion and removal of the stock. For this purpose a latch, shown in the form of a lever 39, is fulcrumed at 40 on the guide arm. Its upper arm has connected thereto a rod 41 sliding at its opposite end in an apertured boss 42 and provided with a handle 43 conveniently located adjacent the handle 31. The lower end of this latch lever 39 is notched at 44 and projects down through an opening in the supporting bed. This latch preferably hangs out of plumb so that when the guide arm is elevated, it will swing to the left and the notch 44 will catch on the top of the bed and hold the guide arm elevated. If necessary, the operator may swing the latch into this position by pulling on the handle 43. Upon pushing on the handle 43 the latch is released and the guide arm may then be lowered to cutting position.

The stock to be cut, an example of which is shown in the round bar 45, is rigidly held on the supporting bed 1 in cutting position by means of a suitable work support. A convenient form of work-support is illustrated having one fixed and one adjustable vise jaw and having means by which it may be adjusted to bring the axis of the work at any required angle with respect to the path of the saw blade. As illustrated, a work supporting bed plate 46 rests upon the supporting bed 1 and is pivoted at 47 thereto. A locking bolt 48 projects down from the plate 46 through an arc-shaped slot 49 in the supporting bed, having its center of curvature at the pivot 47. Thus the work supporting plate 46 may be adjusted at any desired angle with respect to the path of the saw. The work supporting plate carries, preferably formed integrally therewith, a fixed vise jaw 50. A movable vise jaw 51, having a base plate 52, is mounted to slide on the work plate 46 toward and from the fixed vise jaw. This base plate 52 is provided with a locking bolt 53 extending down through a slot 54 in a longitudinally adjustable plate 55 mounted underneath and upon the work plate 46. An adjusting screw 56 is swivelled at 57 in the adjusting plate 55 and threaded through the end of the work supporting bed plate 46. The projecting end of this screw has pivoted thereto an operating handle 58. The locking bolt 53 provides a means for adjusting the movable vise jaw 51 approximately to its desired clamping position, while the adjusting screw 56 provides a means by which the movable vise jaw may be then moved to clamp and unclamp the work.

The saw blade 25, as already pointed out, must have gullets of sufficient capacity to receive the entire amount of material cut by the respective teeth during their passage through the maximum cutting field. In order, therefore, to effect the required correlation of this invention and enable the work to be performed rapidly and economically, a saw blade is provided having very large and coarse teeth with corresponding large gullets. In practice the saw is provided with from four to seven teeth to the inch. These teeth 59 are preferably relieved at the front face, as indicated, by the angle between the vertical line 60 and the line 61 indicating the angle of the front face of the teeth, see Fig. 11. Thus the cutting edge 62 acts like a true cutter or chisel. The teeth are ultimately "set" in the usual manner. The material cut by each tooth is largely in the form of strips or shavings which roll or curl up, and the total bulk of which resulting from one passage of the teeth across the maximum cutting field must not exceed the capacity of the gullet.

Suitable means are provided for giving the required reciprocatory movement to the saw frame upon the guide arm 27. In the construction illustrated, the cutting stroke of the saw is away from the cam shaft 18 and the return stroke is toward this shaft.

Since the return stroke is an idle stroke, it is desirable that it shall be performed as quickly as possible. It is also desirable that the working or cutting stroke shall be performed at as nearly a uniform rate of speed as possib'e. The reciprocatory movement essentially requires, however, that the saw shall come to a dead stop at both ends of its movement. A crank or eccentric connection, which is usually and desirably employed for reciprocating the saw frame, also involves irregularity in the rate of movement.

The construction illustrated is designed within practical limits, while making use of the crank means for effecting the reciprocatory movement of the saw frame, to approximate uniformity of rate of movement of the saw blade during the cutting stroke. In the construction illustrated, the saw frame 24 is connected by a link 63 pivoted thereto at 64 with a crank pin 65 on the crank disk 23. An anti-friction roller 66 on this crank pin 65 rides in the slot 67 of a radially slotted crank arm 68 mounted on and splined at 69 to the cam shaft 18. Since the axis 22 of the crank disk 23 is well above the axis 18 of the crank arm 68, the cutting stroke of the saw frame will take place with relatively slow movement during a relatively large angle of rotation of the cam shaft 18, while the return stroke will take place with a relatively quick movement through a comparatively small angle of rotation of the cam shaft.

A mechanism by which the saw frame and saw blade are continuously, positively and uniformly fed relatively to the work support during the cutting stroke is, as already pointed out, preferably of a type involving a positively acting feed screw. A simple and preferred form of such feeding mechanism is illustrated.

A feed screw frame comprising the standard 70, the base 71, and the overhanging top 72 is mounted at a convenient position on the supporting bed. For this purpose the standard 70 is shown as provided with an integral vertical sleeve 73 fitting over the post 74 rigidly secured by the nut 75 in the supporting bed 1. A feed screw 76 is vertically mounted in the screw frame. This feed screw is swivelled in the overhanging top 72 so as freely to be rotatable in the frame. At its lower end it is journalled in the base 71 and passes down therethrough and has an end bearing at 77 in a bearing sleeve 78 in the supporting bed 1. A nut 79 cooperating with the feed screw 76 is held against rotation by means of a vertical rib 80 mounted to slide in a vertical slot in the standard 70 of the feed screw frame. This rib has pivoted thereto at 81 a link 82, the upper end of which is pivoted at 83 to the saw frame guide arm 27. It will thus be seen that as the feed screw 76 is rotated in one direction or the other, the nut 79 and therewith the guide arm, saw frame and saw will be moved upwardly or downwardly.

Manual means are provided for rotating the feed screw in the knurled knob 84 secured to the upper end of the feed screw 76 above the overhanging top 72 of the screw frame.

The required feeding movement during the cutting stroke of the saw, in the construction illustrated, is obtained by a mechanism operated from the cam shaft 18. A rotatable element in the form of a ratchet wheel 85 is mounted on the supporting bed, directly over the bearing sleeve 78, and is splined at 86 to the feed screw 76 so as to rotate therewith. The bearing sleeve 78, which is itself journalled in the supporting bed 1, has integrally formed therewith a radially projecting arm 87 forming a pawl carrier for a pawl 88 pivoted thereon at 89 and cooperating with the ratchet wheel 85. A spring 90 seated in the pawl carrier and abutting a pin 91 on the pawl 88 serves to hold it yieldingly in engagement with the ratchet wheel. A detent pawl 92 may be provided to prevent reverse rotation of the ratchet wheel. The pawl carrier 87 is connected by a link 93 pivoted thereto at 89 to a rocker arm 94 pivoted at 95 on the supporting bed 1. This link 93 is adjustable radially of the rocker arm 94 by means of a set screw 96 adjustably mounted in the arc-shaped slot 97 of the rocker arm. A link 98 has a pivotal connection at 99 with the rocker arm 94, and at its other end at 100 is pivotally connected to a clevis 101 which is pivotally mounted at 102 in the end of one arm 103 of a bell crank lever fulcrumed at 104 on a standard 105 projecting upwardly from the supporting bed. The other arm 106 of the bell crank lever carries at its free end a roll 107 riding in the cam groove 108 of a face cam 109 splined to the cam shaft 18. The cam groove 108 of the cam 109 is so designed as to transmit through the train of mechanism described to the ratchet wheel 85, and consequently to the feed screw at each rotation of the cam shaft, a feeding movement, during that period of rotation of the cam 109 which takes place simultaneously with the cutting stroke of the saw blade, which is substantially uniform per unit of the cutting stroke. The angle of rotation of the shaft 18 which effects the cutting stroke of the saw blade corresponds to the obtuse angle between the radial lines 110 and 111, see Fig. 10. The cam groove 108 throughout this obtuse angle of rotation is therefore designed to give a feeding movement which shall be compensatory to the more or less variable cutting stroke reciprocation of the saw frame so that as a result each increment of feeding movement of the saw blade toward the work support bears a substantially uniform ratio to each increment of movement of the cutting stroke, that is to say, the feeding movement varies in correlation with the speed of the saw and in substantially the same proportion as the variations in the speed of the saw so that each cutting tooth is fed into the work at a rate which is proportional to the speed of the saw. The feeding movement, it will be observed, takes place in only one direction, and the return movement of the feeding mechanism takes place during the return stroke of the saw blade and while the cam 109 is moving through the acute angle between the lines 111 and 110.

The rate of feeding movement is adjusted or varied with respect to the cutting stroke so as to vary the rate of feed relatively to the speed of the saw blade in its cutting stroke by adjusting the end of the link 93 in the slot 97 of the rocker arm 94.

The saw blade must not be allowed to drag over the work during the return stroke, else the teeth will become dull. Consequently it is necessary to lift the saw blade at the beginning of the return stroke so that the return stroke will take place in a path above the cutting stroke and then to lower the saw blade into position for the succeeding cutting stroke. In the construction illustrated, this is done by raising and lowering the feed screw frame which, by means of the link 82, the nut 79, and the feed screw is rigidly connected to the saw frame guide arm during the return stroke. The sleeve 73, it will be remembered, guides the feed screw frame vertically on the stud 74 and a smaller stud 112 mounted in the supporting bed and passing through an aperture 113 in an extended portion of the base 71 of the feed screw frame acts as a further vertical guide therefor. The sleeve 73 is connected by a link 114 to a slide bar 115. This slide bar at one end slides between recessed blocks 116 and 117 rigidly mounted on the top of the post 74 and held in place by the nut 118. At its opposite end the slide bar 115 is pivoted at 119 to a rocker arm 120 which is pivoted at its lower end at 121 to the supporting bed 1 and at its upper end carries a roll 122 riding in the cam groove 123 of the cam 124 secured to the cam shaft 18. When the cam 124 moves the slide bar 115 to the right or into the position shown in Fig. 7, the vertical distance between the pivotal ends of the link 114 is shortened and as the slide bar is rigidly supported vertically, the sleeve 73, and with it the saw frame guide arm, is lifted. The cam groove 123 is so designed as to cause the cam to be in this position during the return stroke of the saw blade. When the cam moves the slide bar 115 to the left, the sleeve 73, and with it the saw frame guide arm, is lowered into the position required during the cutting stroke. The rotatable element or ratchet wheel 85 is restrained from participating in this lifting and lowering movement by the plate 125, which is secured to the supporting bed and overhangs the ratchet wheel. This plate may also serve as a friction plate, in cooperation with or as a substitute for the detent pawl 92, to prevent undesired rotation of the ratchet wheel. For this purpose the plate 125 is shown as seated on two studs 126 arranged radially of the ratchet wheel. The plate 127 serves as a spacer between the ratchet wheel and the supporting bed, and also as a further support for the studs 126. The inner stud 126 carries a pair of lock nuts 128, by means of which the pressure of the plate 125 on the ratchet wheel may be adjusted.

It is desirable that the saw frame shall be released with respect to the feeding connections upon the completion of the sawing operation, and it is further desirable that engagement between the feeding connections and the saw frame may be effected readily and quickly with the saw frame at any point of elevation with respect to the work support. Simple and efficient means for securing these results are provided in the construction illustrated. The nut 79, hereinbefore referred to as cooperating with the feed screw 76, is preferably in the form of a split nut being made, in the form illustrated, in two parts, which when moved together engage the screw, and when moved apart allow the nut to pass freely over the screw. These parts 129 and 130 are mounted to slide horizontally toward and from each other on the pins 131 mounted in the vertical rib 80. A helical spring 132 seated in opposing recesses in the nut parts between the pins 131 acts normally to separate the nut parts. A latch 133 is pivoted at 134 to the nut part 130 and is provided with a bayonet slot 135 engaging a stud 136 on the other nut part 129. A striker pin 137 is vertically and adjustably mounted in the base 71 of the feed screw frame beneath the latch 133. It will thus be seen that by raising the latch 133 manually, the nut is freed from the feed screw so that the saw frame guide arm may be raised and lowered independently of the feeding mechanism, as when required in starting the sawing operation. Furthermore, by setting the striker pin 137 at the right height, the latch 133 will be released so as to release the nut from the feed screw and thus stop the feeding movement of the saw frame at the conclusion of the sawing operation or at any required point therein.

It will thus be seen that when the split nut is engaged with the feed screw and the machine is in operation, the saw frame guide arm will be fed toward the work support during each cutting stroke continuously and positively at a rate dependent upon the adjustment of the link 93 in the slot 97 of the rocker arm 94. It will also be seen that this feeding movement, whatever may be the adjustment as to the rate of feed, is uniform because there can be no feeding movement of the guide arm, saw frame and saw except as given by the screw. The saw blade is not only positively and continuously fed toward the work, but it is also positively and continually restrained from having any additional feeding movement. Consequently there can be no digging in of the saw blade when the teeth engage a spot of less resistive properties than that of the main portion of the stock. This is the preferred form of the invention, but many advantages of the invention may be secured so long as the feeding movement is positive and continuous and so long as the saw is prevented from having a greater than the predetermined degree of penetration throughout the cutting field. While in the latter case the feeding movement might not be uniform, there would be a uniformity of limit of movement during each cutting stroke. It is, of course, to be understood that the saw blade must be accurately guided both in its reciprocatory movements and in its movements toward and from the work support, but as this involves details of mechanical construction not involved in the present invention, it may be left to ordinary mechanical skill.

Terms such as "vertical", "upper", "lower", etc., which have been used herein are to be taken as terms of relation merely and not of limitation.

Suitable means will usually be provided for delivering a liquid lubricant upon the saw blade as it passes through the stock, but as such means are well known and common and form no part of the present invention, they are not herein illustrated.

A machine constructed in accordance with the principles of this invention operates in practice to cut metal with great efficiency, at high speed and with a true cutting action, as distinguished from a filing or abrading action. Owing to this true cutting action, the life of the saw blade is prolonged indefinitely. Furthermore, with the positive, continuous and uniform feed the time required to make a cut in a given piece of stock can be predetermined with great accuracy and each successive cut will be made in the same time.

The reciprocating type of saw embodying this invention can be constructed at relatively less expense than a band saw machine embodying the invention and the reciprocating type of machine also employs short, and therefore far less expensive, saw blades. But for a large range of work, the reciprocating type of saw is thoroughly practical and, except in cases requiring speed of operation, will give most of the advantages of the larger machine.

It is also to be remembered that a machine of this type, using the thin saw blade, wastes a minimum amount of material in making the cut, which is very important in the case of expensive materials.

The operator, with a little experience, will find no difficulty in bringing the speed of the saw blade, the feeding movement thereof, the resistive properties of the stock being cut, the maximum width of the cutting field of the stock being cut and the gullet capacity of the saw into correlation in accordance with the principles of this invention. For standard qualities of material a table may be prepared showing at what point, with a saw blade of given gullet capacity and for different widths of cut, the link 93 should be set and to what speed the pulley 5 should be adjusted in order to effect the desired correlation.

Having thus described the invention, what is claimed as new, and desired to be secured by Letters Patent, is:

1. A metal cutting machine comprising a work support, a saw blade having an edge provided with teeth and with gullets intermediate the successive teeth of sufficient capacity to permit the coiling therein of strips of metal cut from the stock by the respective teeth throughout the cutting field, means for reciprocating the saw blade to give the cutting stroke and a return stroke in a path above the path of the cutting stroke, and means acting during the cutting stroke continuously and positively to feed the saw blade relatively to the work support and to prevent greater than a predetermined depth of penetration, in which machine the speed of the saw during the cutting stroke, the feeding movement thereof, the resistive properties of the stock being cut, the maximum cutting field of the stock being cut and the capacity of the gullets of the saw are correlated to cause each tooth during its cutting engagement with the stock to cut metal therefrom of a maximum bulk not greater than the capacity of a gullet.

2. A metal cutting machine comprising a work support, a saw blade having an edge provided with teeth and with gullets intermediate the successive teeth of sufficient capacity to permit the coiling therein of strips of metal cut from the stock by the respective teeth throughout the cutting field, means for reciprocating the saw blade to give the cutting stroke and a return stroke in a path above the path of the cutting stroke, means acting during the cutting stroke continuously, positively, and uniformly per unit of cutting stroke to feed the saw blade relatively to the work support, in which machine the speed of the saw during the cutting stroke, the feeding movement thereof, the resistive properties of the stock being cut, the maximum cutting field of the stock being cut and the capacity of the gullets of the saw are correlated to cause each tooth during its cutting engagement with the stock to cut metal therefrom of a maximum bulk not greater than the capacity of a gullet.

3. A metal cutting machine comprising a work support, a saw blade having an edge provided with teeth and with gullets intermediate the successive teeth of sufficient capacity to permit the coiling therein of strips of metal cut from the stock by the respective teeth throughout the cutting field, means for giving a variable reciprocatory movement to the saw blade to give a cutting stroke and a return stroke in a path above the path of the cutting stroke, and means acting during the cutting stroke with a variable movement compensatory to the reciprocatory movement to feed the saw relatively to the work support continuously, positively, and uniformly per unit of cutting stroke, in which machine the speed of the saw during the cutting stroke, the feeding movement thereof, the resistive properties of the stock being cut, the maximum cutting field of the stock being cut and the capacity of the gullets of the saw are correlated to cause each tooth during its cutting engagement with the stock to cut metal therefrom of a maximum bulk not greater than the capacity of a gullet.

4. A metal cutting machine comprising a horizontal work support, a vertically and longitudinally movable saw frame, a saw blade mounted in the frame having an edge provided with teeth and with gullets intermediate the successive teeth of sufficient capacity to permit the coiling therein of strips of metal cut from the stock by the respective teeth throughout the cutting field, means for longitudinally reciprocating the saw frame to give a cutting stroke and a return stroke in a path above the path of the cutting stroke, feeding means acting during the cutting stroke continuously, positively, and uniformly per unit of cutting stroke to feed the saw frame toward the work support, means for connecting the feeding means to the saw frame when the frame is in any vertical position, and means acting automatically to disconnect the feeding means and saw frame when the saw blade has been fed to a predetermined position with respect to the work support, in which machine the speed of the saw during the cutting stroke, the feeding movement thereof, the resistive properties of the stock being cut, the maximum cutting field of the stock being cut and the capacity of the gullets of the saw are correlated to cause each tooth during its cutting engagement with the stock to cut metal therefrom of a maximum bulk not greater than the capacity of a gullet.

5. A metal cutting machine comprising a supporting bed, a work support on the bed, a vertically movable guide arm, a saw frame longitudinally movable on the guide arm, a saw blade mounted in the saw frame, means for longitudinally reciprocating the saw frame on the guide arm to give alternating cutting and return strokes having initial accelerated and final retarded movements, means for lifting the guide arm at the beginning and for lowering it at the end of the return stroke of the saw blade, and feeding means connected to the guide arm acting during the cutting stroke to feed the guide arm continuously and positively relatively to the work support and also acting to vary the feeding movement in correlation with and in substantially the same proportion as the variations in the speed of the saw.

6. A metal cutting machine comprising a supporting bed, a work support on the bed, a vertically movable guide arm, a saw frame longitudinally movable on the guide arm, a saw blade mounted in the saw frame, means for longitudinally reciprocating the saw frame on the guide arm to give alternating cutting and return strokes having initial accelerated and final retarded movements, means for lifting the guide arm at the beginning and for lowering it at the end of the return stroke of the saw blade, feeding means connected to the guide arm acting during the cutting stroke to feed the guide arm continuously and positively relatively to the work support and also acting to vary the feeding movement in correlation with and in substantially the same proportion as the variations in the speed of the saw, and means for adjusting the feeding means to adjust the rate of movement of the guide arm.

7. A metal cutting machine comprising a supporting bed, a work support on the bed, a vertically movable horizontally extending guide arm, a saw frame longitudinally movable on the guide arm, a saw blade mounted in the saw frame, means for longitudinally reciprocating the saw frame on the guide arm to give alternating cutting and return strokes having initial accelerated and final retarded movements to the saw blade, means for lifting the guide arm at the beginning and for lowering it at the end of the return stroke of the saw blade a fixed distance to prevent the saw blade dragging on the work during the return stroke, feeding means connected to the guide arm and acting during the cutting stroke to move the guide arm continuously, and positively toward the work support and to vary the feeding movement in correlation with and in substantially the same proportion as the variations in the speed of the saw, means for changing the speed of reciprocation of the saw arm and independent means for adjusting the feeding means to vary the rate of movement of the guide arm.

8. A metal cutting machine comprising a supporting bed, a saw frame vertically and longitudinally movable with respect to the bed, a saw blade mounted in the frame, means for longitudinally reciprocating the saw frame to give alternating cutting and return strokes to the saw blade, a feed screw, means for positively rotating said feed screw continuously during the cutting stroke, a nut cooperating with the feed screw and releasable therefrom, a connection between the nut and the saw frame whereby the rotation of the feed screw will feed said saw frame relatively to the supporting bed, and means for automatically disengaging the nut from said screw at a predetermined point during the feeding operation.

9. A metal cutting machine comprising a supporting bed, a saw frame vertically and longitudinally movable with respect to the bed, a saw blade mounted in the saw frame, means for longitudinally reciprocating the saw frame to give alternating cutting and return strokes to the saw blade, a feed screw frame mounted and vertically movable toward and from the bed, a feed screw rotatably mounted in the feed screw frame, means for rotating the feed screw during the cutting stroke, a nut cooperating with the feed screw and releasable therefrom, a connection between the nut and the saw frame whereby the latter moves with the former, and means for lifting the screw frame at the beginning, and for lowering it at the end of the return stroke of the saw frame and means for automatically disengaging said nut from said screw at a predetermined point during the feeding operation.

10. A metal cutting machine comprising a supporting bed, a saw frame vertically and longitudinally movable with respect to the bed, a saw blade mounted in the saw frame, means for longitudinally reciprocating the saw frame to give alternating cutting and return strokes to the saw blade, a feed screw frame mounted and vertically movable on the bed, a rotatable element mounted, and vertically immovable on the bed, a feed screw rotatably mounted on the screw frame and splined to the rotatable element to rotate therewith, means for rotating the rotatable element to effect a continuous, and positive feeding movement toward the work support and to vary the feeding movement in correlation with and in substantially the same proportion as the variations in the speed of the saw, a nut cooperating with the feed screw, a connection between the nut and the saw frame to cause the latter to move with the former, and means for lifting the screw frame at the beginning and for lowering it at the end, of the return stroke.

11. A metal cutting machine comprising the construction defined in claim 10 in which the nut is split, together with means of acting normally to open the nut and release it from the feed screw, means to retain the split nut closed during the feeding movement of the saw frame, and means automatically operable to release said retaining means when the screw has fed the nut to bring the saw blade to a predetermined point from the supporting bed.

12. A metal cutting machine comprising the construction defined in claim 10 in which the said nut is split, together with means acting normally to open the nut and release it from the feed screw, a latch to retain the split nut closed, and a striker pin in position to engage and release the latch when the feed screw has fed the nut to bring the saw blade to a predetermined point from the supporting bed.

13. A metal cutting machine comprising the construction defined in claim 10 in which the said means for lifting and lowering the screw frame comprises a rotatable cam, a slide bar held against vertical movement, means operable by said cam to reciprocate the slide bar horizontally upon each rotation of the cam, and a connection between the slide bar and screw frame acting when the slide bar is moved in one direction to lift, and when moved in the other direction to lower, the screw frame.

14. A metal cutting machine comprising a supporting bed, a saw frame vertically and longitudinally movable with respect to the bed, a saw blade mounted in the frame, means for longitudinally reciprocating the saw frame to give alternating cutting and return strokes to the saw blade, a feed screw, means for positively rotating said feed screw continuously during the cutting stroke, means for positively maintaining the feed screw against vertical movement during the cutting stroke, a nut cooperating with the feed screw, a connection between the nut and the saw frame whereby the rotation of the feed screw will feed said saw frame relatively to the supporting bed.

15. A metal cutting machine comprising a supporting bed, a saw frame vertically and longitudinally movable with respect to the bed, a saw blade mounted in the frame, means for longitudinally reciprocating the saw frame to give alternating cutting and return strokes to the saw blade, a feed screw, means for positively rotating said feed screw continuously during the cutting stroke, means for positively maintaining the feed screw against vertical movement during the cutting stroke, a nut cooperating with the feed screw, a connection between the nut and the saw frame whereby the rotation of the feed screw will feed said saw frame relatively to the supporting bed, and means for positively lifting the feed screw at the beginning and for positively lowering it at the end of the cutting stroke.

16. A metal cutting machine comprising a supporting bed, a saw frame vertically and longitudinally movable with respect to the bed, a saw blade mounted in the saw frame, means for longitudinally reciprocating the saw frame to give alternating cutting and return strokes to the saw blade, means acting positively and continuously to feed the saw during the cutting stroke including a feed screw, a ratchet on said feed screw, a pawl engaging said ratchet, a movable pawl carrying arm, a rocker arm, and means for oscillating the rocker arm, and means connecting the rocker arm to the pawl carrying arm adjustable longitudinally of the rocker arm to vary the amplitude of movement of the pawl carrying the arm.

17. A metal cutting machine comprising a supporting bed, a saw frame vertically and longitudinally movable with respect to the bed, a saw blade mounted in the saw frame, means for longitudinally reciprocating the saw frame to give alternating cutting and return strokes to the saw blade, means acting positively and continuously to feed the saw during the cutting stroke including a feed screw, a ratchet on said feed screw, a pawl engaging said ratchet, a movable pawl carrying arm, a rocker arm having a longitudinal slot therein, means for oscillating the rocker arm, a link connected at one end to the pawl carrying arm and having means adjustable in the slot of the rocker arm to connect the link thereto, whereby the amplitude of movement of the pawl carrying arm may be varied.

In testimony whereof, we have signed our names to this specification.

ARTHUR G. THOMPSON.
LINUS K. SPRAGUE.